US012615210B2

(12) United States Patent
Liu

(10) Patent No.: US 12,615,210 B2
(45) Date of Patent: Apr. 28, 2026

(54) METHOD AND APPARATUS FOR DETERMINING SLICE INFORMATION, STORAGE MEDIUM, AND ELECTRONIC DEVICE

(71) Applicant: ZTE Corporation, Shenzhen (CN)

(72) Inventor: Yao Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 283 days.

(21) Appl. No.: 18/275,640

(22) PCT Filed: May 31, 2022

(86) PCT No.: PCT/CN2022/096437
§ 371 (c)(1),
(2) Date: Aug. 3, 2023

(87) PCT Pub. No.: WO2022/262574
PCT Pub. Date: Dec. 22, 2022

(65) Prior Publication Data
US 2024/0129233 A1 Apr. 18, 2024

(30) Foreign Application Priority Data
Jun. 16, 2021 (CN) .......................... 202110668840.5

(51) Int. Cl.
*H04L 45/745* (2022.01)
*H04L 45/00* (2022.01)
(Continued)

(52) U.S. Cl.
CPC ............ *H04L 45/745* (2013.01); *H04L 45/34* (2013.01); *H04L 45/50* (2013.01); *H04L 69/22* (2013.01)

(58) Field of Classification Search
None
See application file for complete search history.

(56) References Cited

U.S. PATENT DOCUMENTS 11,039,359 B1 * 6/2021 Paczkowski .......... H04W 36/12
2015/0131764 A1 * 5/2015 Kushner ................. H04L 69/22
375/343

(Continued)

FOREIGN PATENT DOCUMENTS

CN 108770016 A 11/2018
CN 1109586938 A 4/2019
(Continued)

OTHER PUBLICATIONS

International Search Report for corresponding application PCT/CN2022/096437 filed May 31, 2022; Mail date Aug. 17, 2022.
(Continued)

*Primary Examiner* — Xavier S Wong
(74) *Attorney, Agent, or Firm* — CANTOR COLBURN LLP

(57) ABSTRACT

A method and apparatus for determining slice information, a storage medium, and an electronic device. The method includes: receiving an initial packet; determining, from pre-configured templates, a target template matching the initial packet, wherein the target template contains a target format of target slice information of a target slice associated with the initial packet; generating a target packet based on the initial packet and the target template, wherein the target packet contains the target slice information in the target format; and sending the target packet to a receiving end to instruct the receiving end to execute following operations: parsing the target packet based on the target template, so as to determine the target slice information.

19 Claims, 7 Drawing Sheets

(51) Int. Cl.
  H04L 45/50       (2022.01)
  H04L 69/22       (2022.01)

(56)                 References Cited

U.S. PATENT DOCUMENTS

| | | | | |
|---|---|---|---|---|
| 2018/0316564 | A1* | 11/2018 | Senarath | ............. H04L 41/5051 |
| 2020/0382374 | A1* | 12/2020 | Yi | ........................... H04L 41/40 |
| 2021/0051070 | A1* | 2/2021 | Akman | ................... H04W 4/50 |
| 2021/0075678 | A1 | 3/2021 | Seetharaman et al. | |
| 2021/0359930 | A1* | 11/2021 | Du | .......................... H04L 45/64 |
| 2022/0038364 | A1* | 2/2022 | Du | .......................... H04L 45/02 |

FOREIGN PATENT DOCUMENTS

| | | | |
|---|---|---|---|
| CN | 111050361 | A | 4/2020 |
| CN | 111107004 | A | 5/2020 |
| EP | 3595244 | A1 | 1/2020 |
| EP | 3790356 | A1 | 3/2021 |
| WO | 2019073638 | A1 | 4/2019 |
| WO | 2020182289 | A1 | 9/2020 |

OTHER PUBLICATIONS

European Search Report for corresponding application EP22824054;
Report dated Aug. 20, 2024.

* cited by examiner

Fig. 2

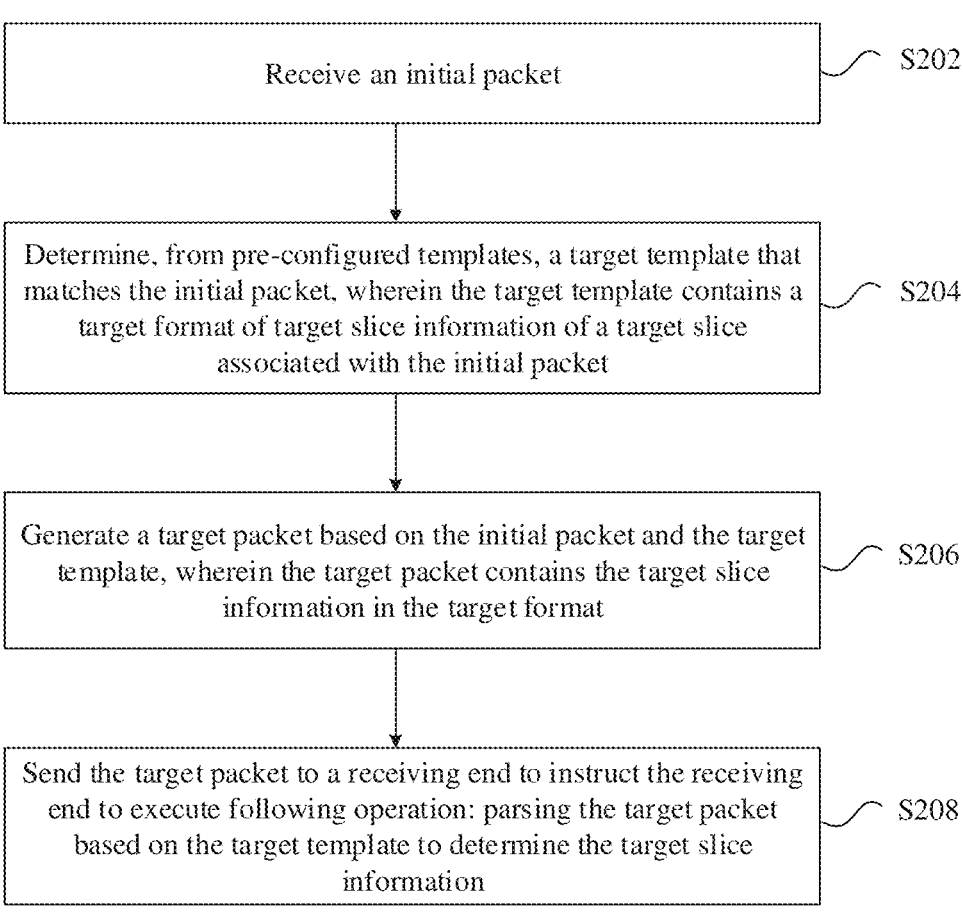

Receive an initial packet        S202

Determine, from pre-configured templates, a target template that matches the initial packet, wherein the target template contains a target format of target slice information of a target slice associated with the initial packet        S204

Generate a target packet based on the initial packet and the target template, wherein the target packet contains the target slice information in the target format        S206

Send the target packet to a receiving end to instruct the receiving end to execute following operation: parsing the target packet based on the target template to determine the target slice information        S208

Fig. 3

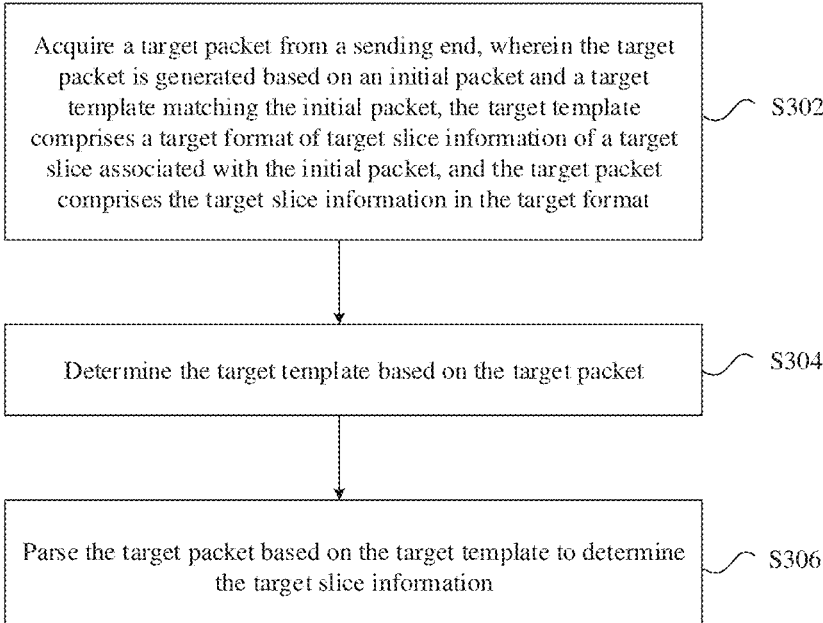

Acquire a target packet from a sending end, wherein the target packet is generated based on an initial packet and a target template matching the initial packet, the target template comprises a target format of target slice information of a target slice associated with the initial packet, and the target packet comprises the target slice information in the target format — S302

Determine the target template based on the target packet — S304

Parse the target packet based on the target template to determine the target slice information — S306

Fig. 4

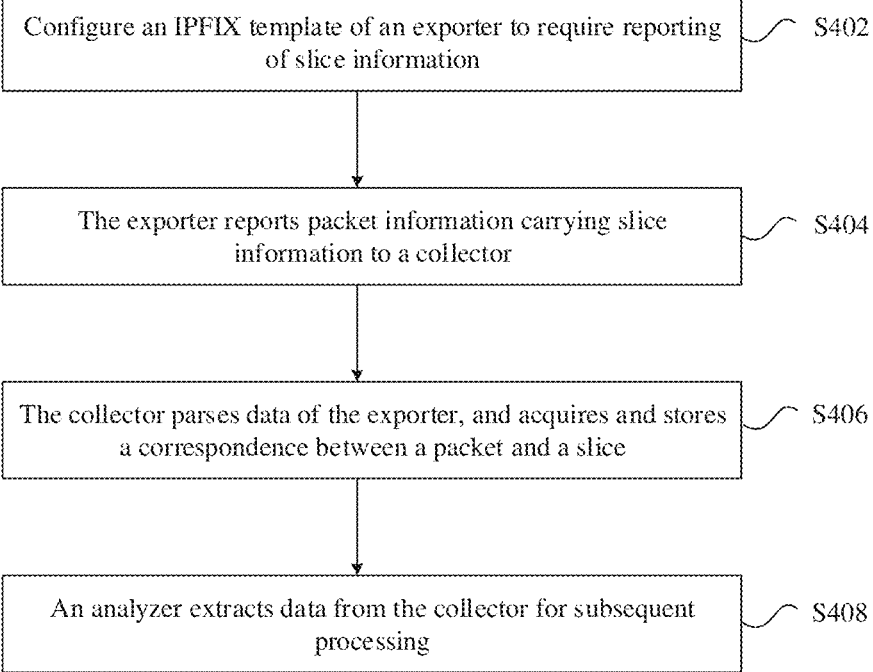

Configure an IPFIX template of an exporter to require reporting of slice information — S402

The exporter reports packet information carrying slice information to a collector — S404

The collector parses data of the exporter, and acquires and stores a correspondence between a packet and a slice — S406

An analyzer extracts data from the collector for subsequent processing — S408

Fig. 5

```
        0                   1                   2                   3
        0 1 2 3 4 5 6 7 8 9 0 1 2 3 4 5 6 7 8 9 0 1 2 3 4 5 6 7 8 9 0 1
        +-+-+-+-+-+-+-+-+-+-+-+-+-+-+-+-+-+-+-+-+-+-+-+-+-+-+-+-+-+-+-+-+
        |            Set ID = 2             |      Length = XX octets     |
        +-+-+-+-+-+-+-+-+-+-+-+-+-+-+-+-+-+-+-+-+-+-+-+-+-+-+-+-+-+-+-+-+
        |          Template ID 256          |       Field Count = 4       |
        +-+-+-+-+-+-+-+-+-+-+-+-+-+-+-+-+-+-+-+-+-+-+-+-+-+-+-+-+-+-+-+-+
        |0|    sourceIPv6Address = 27       |      Field Length = 32      |
        +-+-+-+-+-+-+-+-+-+-+-+-+-+-+-+-+-+-+-+-+-+-+-+-+-+-+-+-+-+-+-+-+
        |0| destinationIPv6Address = 28     |      Field Length = 32      |
        +-+-+-+-+-+-+-+-+-+-+-+-+-+-+-+-+-+-+-+-+-+-+-+-+-+-+-+-+-+-+-+-+
        |0|  networksliceID type = TBA1     |      Field Length = 4       |
        +-+-+-+-+-+-+-+-+-+-+-+-+-+-+-+-+-+-+-+-+-+-+-+-+-+-+-+-+-+-+-+-+
        |0|  networksliceID value = TBA2    |      Field Length = 4       |
        +-+-+-+-+-+-+-+-+-+-+-+-+-+-+-+-+-+-+-+-+-+-+-+-+-+-+-+-+-+-+-+-+
```

Fig. 6

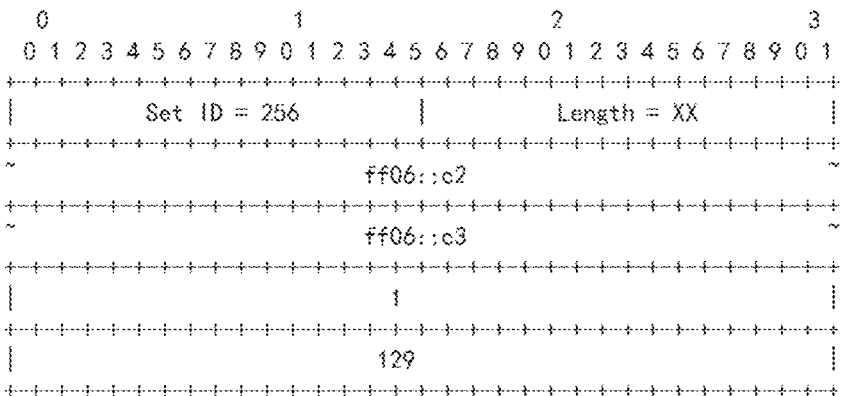

```
        0                   1                   2                   3
        0 1 2 3 4 5 6 7 8 9 0 1 2 3 4 5 6 7 8 9 0 1 2 3 4 5 6 7 8 9 0 1
        +-+-+-+-+-+-+-+-+-+-+-+-+-+-+-+-+-+-+-+-+-+-+-+-+-+-+-+-+-+-+-+-+
        |            Set ID = 256           |        Length = XX          |
        +-+-+-+-+-+-+-+-+-+-+-+-+-+-+-+-+-+-+-+-+-+-+-+-+-+-+-+-+-+-+-+-+
        ~                             ff06::c2                           ~
        +-+-+-+-+-+-+-+-+-+-+-+-+-+-+-+-+-+-+-+-+-+-+-+-+-+-+-+-+-+-+-+-+
        ~                             ff06::c3                           ~
        +-+-+-+-+-+-+-+-+-+-+-+-+-+-+-+-+-+-+-+-+-+-+-+-+-+-+-+-+-+-+-+-+
        |                                1                              |
        +-+-+-+-+-+-+-+-+-+-+-+-+-+-+-+-+-+-+-+-+-+-+-+-+-+-+-+-+-+-+-+-+
        |                               129                             |
        +-+-+-+-+-+-+-+-+-+-+-+-+-+-+-+-+-+-+-+-+-+-+-+-+-+-+-+-+-+-+-+-+
```

Fig. 7

```
        0                   1                   2                   3
        0 1 2 3 4 5 6 7 8 9 0 1 2 3 4 5 6 7 8 9 0 1 2 3 4 5 6 7 8 9 0 1
        +-+-+-+-+-+-+-+-+-+-+-+-+-+-+-+-+-+-+-+-+-+-+-+-+-+-+-+-+-+-+-+-+
        |            Set ID = 2             |      Length = XX octets     |
        +-+-+-+-+-+-+-+-+-+-+-+-+-+-+-+-+-+-+-+-+-+-+-+-+-+-+-+-+-+-+-+-+
        |          Template ID 257          |       Field Count = 4       |
        +-+-+-+-+-+-+-+-+-+-+-+-+-+-+-+-+-+-+-+-+-+-+-+-+-+-+-+-+-+-+-+-+
        |0|     flowLabelIPv6 = 31          |      Field Length = 4       |
        +-+-+-+-+-+-+-+-+-+-+-+-+-+-+-+-+-+-+-+-+-+-+-+-+-+-+-+-+-+-+-+-+
        |0| destinationIPv6Address = 28     |      Field Length = 32      |
        +-+-+-+-+-+-+-+-+-+-+-+-+-+-+-+-+-+-+-+-+-+-+-+-+-+-+-+-+-+-+-+-+
        |0|  networksliceID type = TBA1     |      Field Length = 4       |
        +-+-+-+-+-+-+-+-+-+-+-+-+-+-+-+-+-+-+-+-+-+-+-+-+-+-+-+-+-+-+-+-+
        |0|networksliceID position=TBA3     |      Field Length = 4       |
        +-+-+-+-+-+-+-+-+-+-+-+-+-+-+-+-+-+-+-+-+-+-+-+-+-+-+-+-+-+-+-+-+
```

Fig. 8

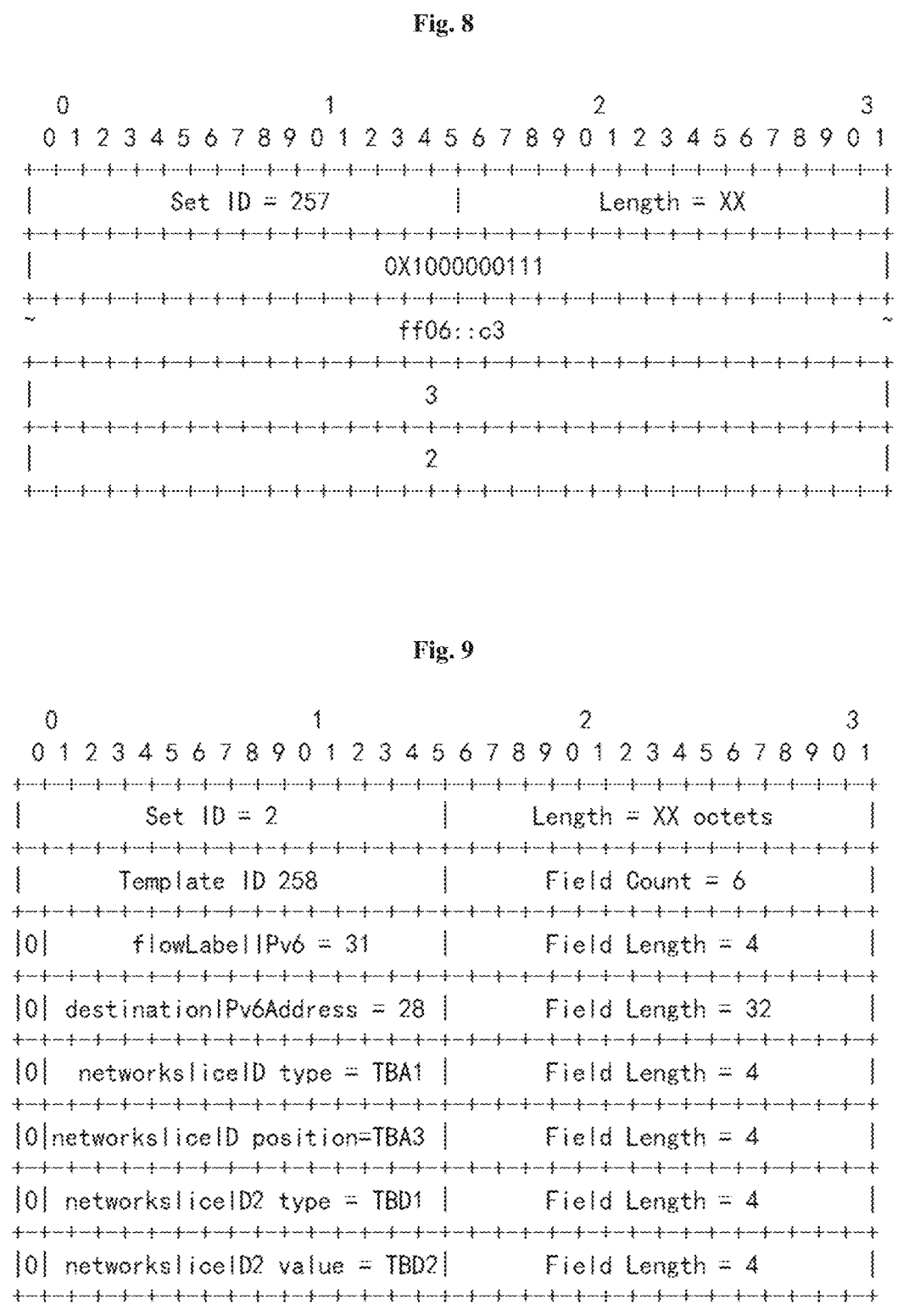

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Set ID = 257           |           Length = XX      |
+-+-+-+-+-+-+-+-+-+-+-+-+-+-+-+-+-+-+-+-+-+-+-+-+-+-+-+-+-+-+-+-+
|                         0X1000000111                          |
+-+-+-+-+-+-+-+-+-+-+-+-+-+-+-+-+-+-+-+-+-+-+-+-+-+-+-+-+-+-+-+-+
~                          ff06::c3                             ~
+-+-+-+-+-+-+-+-+-+-+-+-+-+-+-+-+-+-+-+-+-+-+-+-+-+-+-+-+-+-+-+-+
|                             3                                 |
+-+-+-+-+-+-+-+-+-+-+-+-+-+-+-+-+-+-+-+-+-+-+-+-+-+-+-+-+-+-+-+-+
|                             2                                 |
+-+-+-+-+-+-+-+-+-+-+-+-+-+-+-+-+-+-+-+-+-+-+-+-+-+-+-+-+-+-+-+-+
```

Fig. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Set ID = 2            |      Length = XX octets    |
+-+-+-+-+-+-+-+-+-+-+-+-+-+-+-+-+-+-+-+-+-+-+-+-+-+-+-+-+-+-+-+-+
|          Template ID 258          |      Field Count = 6       |
+-+-+-+-+-+-+-+-+-+-+-+-+-+-+-+-+-+-+-+-+-+-+-+-+-+-+-+-+-+-+-+-+
|0|       flowLabelIPv6 = 31        |      Field Length = 4      |
+-+-+-+-+-+-+-+-+-+-+-+-+-+-+-+-+-+-+-+-+-+-+-+-+-+-+-+-+-+-+-+-+
|0| destinationIPv6Address = 28     |      Field Length = 32     |
+-+-+-+-+-+-+-+-+-+-+-+-+-+-+-+-+-+-+-+-+-+-+-+-+-+-+-+-+-+-+-+-+
|0|   networksliceID type = TBA1    |      Field Length = 4      |
+-+-+-+-+-+-+-+-+-+-+-+-+-+-+-+-+-+-+-+-+-+-+-+-+-+-+-+-+-+-+-+-+
|0|networksliceID position=TBA3     |      Field Length = 4      |
+-+-+-+-+-+-+-+-+-+-+-+-+-+-+-+-+-+-+-+-+-+-+-+-+-+-+-+-+-+-+-+-+
|0| networksliceID2 type = TBD1     |      Field Length = 4      |
+-+-+-+-+-+-+-+-+-+-+-+-+-+-+-+-+-+-+-+-+-+-+-+-+-+-+-+-+-+-+-+-+
|0| networksliceID2 value = TBD2    |      Field Length = 4      |
+-+-+-+-+-+-+-+-+-+-+-+-+-+-+-+-+-+-+-+-+-+-+-+-+-+-+-+-+-+-+-+-+
```

METHOD AND APPARATUS FOR DETERMINING SLICE INFORMATION, STORAGE MEDIUM, AND ELECTRONIC DEVICE

CROSS-REFERENCE TO RELATED APPLICATION

This application is a National Stage Filing of PCT International Application No. PCT/CN2022/096437 filed on May 31, 2022, which is based on and claims priority to Chinese Patent Application No. CN202110668840.5 filed on Jun. 16, 2021 and entitled "METHOD AND APPARATUS FOR DETERMINING SLICE INFORMATION, STORAGE MEDIUM, AND ELECTRONIC DEVICE", the content of which is incorporated herein by reference in its entirety.

TECHNICAL FIELD

The present disclosure relates to the field of communications, and in particular, to a method and apparatus for determining slice information, a storage medium, and an electronic device.

BACKGROUND

Segment Routing (SR) is a source address-based routing method. A Segment Routing Header (SRH) is carried in a packet header of an existing Multi-Protocol Label Switching (MPLS) network or an Internet Protocol Version 6 (IPv6) packet header. The SRH carries a series of instruction operations (also referred to as segment operations) for routing and transmission of data in the network.

An IP Flow Information Export (IPFIX) protocol is a protocol for data flow characteristic analysis and template-based formatted output. The format defined by the IPFIX is based on a data output format of Cisco Netflow Version 9, and enables IP flow information to be transferred from an Exporter to a Collector. The IPFIX unifies a traffic monitoring standard, and simplifies a flow output architecture by using a single and consistent model. The IPFIX may be used for facilitating services such as traffic accounting, traffic engineering, attack monitoring, and network Quality of Service (QoS) monitoring.

A breakthrough concept of Network Slicing is proposed in a 5G network architecture. By means of network slicing, an operator is enabled to construct a plurality of dedicated, virtualized and isolated logical networks on a universal physical platform, so as to satisfy different requirements of different customers on network capabilities. A network slice is a logically independent virtual network structure formed by a combination of network functions. Different network slices correspond to different resource assurances and service levels, and in particular, different network slices may have huge differences in their charging standards and operation and maintenance costs.

An Identity (ID) of a network slice may be referred to as a slice identifier or a slice ID for short, and is used for identifying the network slice. According to technical means for specifically implementing a network slice, a slice identifier may have different meanings and forms. Any identifier that can uniquely distinguish slices or resources within a specific range (for example, within the same physical port/link, within the same Interior Gateway Protocol (IGP) domain, within the entire network, etc.) may serve as a slice identifier. For example, in draft-dong-6man-enhanced-vpn-vtn-id, slice virtual topology may be divided according to IGP Multi-topology, and a multi-topology ID may serve as a slice identifier. In a case where slices are divided according to IGP Multi-process, an IGP process number may serve as a slice identifier. In a case where slices are divided according to a flex-algorithm (FA) defined in draft-ietf-lsr-flex-algo, an FA ID may serve as a slice identifier. In a case where slices are globally identified according to a global Administrative Instance Identifier (AII) in draft-peng-lsr-network-slicing, AII may serve as a slice identifier.

The existing method for carrying slice information may have the following problems. 1) There may be some legacy devices in a network, and even if a legacy device sets a corresponding field, this field may not represent a slice identifier from the perspective of this legacy device. Therefore, a packet analyzer needs to acquire the capability of each device in order to accurately acquire a slice identifier corresponding to a packet. 2) Different manners for carrying a slice identifier in a packet may be adopted in different forwarding plane technologies. Once a carrying position of the slice identifier changes or a new forwarding technology is introduced, the logic of a network analyzer needs to be updated accordingly.

Aiming at the problem in the related art that slice information cannot be carried effectively in reported flow information, no effective solution has been proposed at present.

SUMMARY

Embodiments of the present disclosure provide a method and apparatus for determining slice information, a storage medium, and an electronic device, which may at least solve the problem in the related art that slice information cannot be effectively carried in reported flow information.

According to an aspect of the embodiments of the present disclosure, a method for determining slice information is provided, including: receiving an initial packet; determining, from pre-configured templates, a target template matching the initial packet, where the target template contains a target format of target slice information of a target slice associated with the initial packet; generating a target packet based on the initial packet and the target template, where the target packet contains the target slice information in the target format; and sending the target packet to a receiving end to instruct the receiving end to execute following operations: parsing the target packet based on the target template, so as to determine the target slice information.

According to another aspect of the embodiments of the present disclosure, a method for determining slice information is also provided, including: acquiring a target packet from a sending end, where the target packet is generated based on an initial packet and a target template matching the initial packet, the target template contains a target format of target slice information of a target slice associated with the initial packet, and the target packet contains the target slice information in the target format; determining the target template based on the target packet; and parsing the target packet based on the target template to determine the target slice information.

According to yet another aspect of the embodiments of the present disclosure, an apparatus for determining slice information is further provided, including: a receiving module, configured to receive an initial packet; a first determining module, configured to determine, from pre-configured templates, a target template matching the initial packet, where the target template contains a target format of target slice information of a target slice associated with the initial packet; a generating module, configured to generate a target packet based on the initial packet and the target template, where the target packet contains the target slice information in the target format; and a first sending module, configured to send the target packet to a receiving end to instruct the receiving end to execute following operations: parsing the target packet based on the target template, so as to determine the target slice information.

According to another aspect of the embodiments of the present disclosure, an apparatus for determining slice information is further provided, including: a first acquiring module, configured to acquire a target packet from a sending end, where the target packet is generated based on an initial packet and a target template matching the initial packet, the target template contains a target format of target slice information of a target slice associated with the initial packet, and the target packet contains the target slice information in the target format; a second determining module, configured to determine the target template based on the target packet; and a third determining module, configured to parse the target packet based on the target template to determine the target slice information.

According to another aspect of the embodiments of the present disclosure, a computer-readable storage medium is further provided, where the computer-readable storage medium stores a computer program, and the computer program, when running on a processor, causes the processor to execute operations in any one of the method embodiments.

According to another aspect of the embodiments of the present disclosure, an electronic device is also provided, including a memory, a processor and a computer program stored in the memory and operable on the processor, where the processor is configured to execute operations in any one of the method embodiments when running the computer program.

BRIEF DESCRIPTION OF THE DRAWINGS

Drawings, provided for further understanding of the present disclosure and forming a part of the description, are used to explain the present disclosure together with exemplary embodiments of the present disclosure rather than to limit the present disclosure. In the drawings:

FIG. 2 is a flowchart I of a method for determining slice information according to the embodiments of the present disclosure;

FIG. 3 is a flowchart II of a method for determining slice information according to the embodiments of the present disclosure;

FIG. 4 is a flowchart of a method for collecting slice information according to the embodiments of the present disclosure;

FIG. 5 is a schematic diagram I of a data template carrying slice information and reported by an exporter according to the embodiments of the present disclosure;

FIG. 6 is a schematic diagram I of actual data content reported by an exporter according to the embodiments of the present disclosure;

FIG. 7 is a schematic diagram II of a data template carrying slice information and reported by an exporter according to the embodiments of the present disclosure;

FIG. 8 is a schematic diagram II of actual data content reported by an exporter according to the embodiments of the present disclosure;

FIG. 9 is a schematic diagram of a data template carrying hierarchical slice information and reported by an exporter according to the embodiments of the present disclosure;

DETAILED DESCRIPTION

Figure 1:
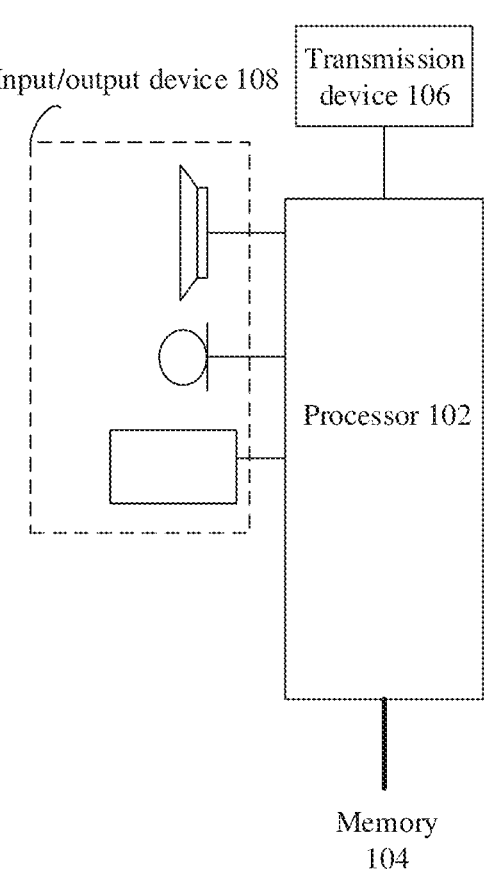
FIG. 1 is a block diagram showing the hardware structure of a mobile terminal for determining slice information according to the embodiments of the present disclosure.

In order to make those having ordinary skill in the art better understand the solutions of the present disclosure, the following clearly and completely describes the technical solutions in the embodiments of the present disclosure with reference to the accompanying drawings in the embodiments of the present disclosure. Apparently, the described embodiments are merely a part of rather than all of the embodiments of the present disclosure. All other embodiments obtained by those having ordinary skill in the art based on the embodiments of the present disclosure without creative efforts shall belong to the scope of protection of the present disclosure.

It should be noted that, terms such as "first" and "second" in the description, claims, and accompanying drawings of the present disclosure are used to distinguish similar objects, but are not necessarily used to describe a specific sequence or order. It should be understood that the data so used may be interchanged where appropriate so that embodiments of the present disclosure described herein may be implemented in sequences other than those illustrated or described herein. In addition, the terms "contain/include/include" and "have", and any variations thereof, are intended to cover a non-exclusive inclusion, for example, a process, method, system, product, or apparatus that includes a series of operations or units is not necessarily limited to those operations or units that are expressly listed, but may include other operations or units that are not expressly listed or inherent to such process, method, product, or apparatus.

In the related art, a network slice identifier is mainly carried in the following manners.

Manner 1, a network slice identifier is explicitly carried in a packet. In general, there are two modes for carrying the network slice identifier. In the first mode, an existing field in a packet is appropriately modified to carry a slice identifier. For example, in an IPv6 network, according to draft-filsfils-spring-srv6-stateless-slice-id, a bit is reserved in a Traffic Class field of an IPv6 packet header, and when the bit is set, it indicates that a Flow Label field of the packet header carries a slice identifier, and a part of bits in the Flow Label field are used to carry a specific value of the slice identifier. For another example, in an MPLS network, according to draft-decraene-mpls-slid-encoded-entropy-label-id, a part of bits in the MPLS Entropy Label are used to carry the slice information. In the second mode, a new field dedicated for carrying a slice identifier is defined. For example, in draft-dong-6man-enhanced-vpn-vtn-id, an option of an IPv6 hop-by-hop option header (abbreviated as HBH header) is newly defined for carrying a slice identifier.

Manner 2, the packet does not carry a slice identifier, and a mapping relationship between traffic and slice is provided in a local table entry of each forwarding device in the network. For example, a mapping relationship between a segment routing SID/MPLS label/IP address and a slice may be provided in a local table entry of each forwarding device in the network.

Manner 3 is a combination of Manner 1 and Manner 2, a slice identifier is carried in a packet, and meanwhile, the forwarding device also locally stores the correspondence between the packet and the slice. This approach may be applied to a hierarchical slice architecture. For example, a network is first divided into several large top layer slices based on a global slice ID (for example, one slice corresponds to one province), and then each slice is divided into multiple sub-slices based on FA. The node first determines a specific top layer slice according to the slice ID carried in the packet, then continues to search for a forwarding entry of a corresponding sub-slice under the top layer slice according to a locally stored correspondence between the packet and the sub-slice, and finally forwards the packet.

Manner 4, in a network having only one layer of slice, the manner of carrying a slice identifier in a packet, and meanwhile locally storing a slice identifier on each forwarding device may also be adopted. The apparatus first extracts a slice identifier according to the packet, and a forwarding entry related to the slice identifier is stored in a local table entry. The extracted slice identifier is mapped with the identifier in the local table entry (the mapping condition being that the two are consistent or the two have a mapping relationship), and then a forwarding action (operation/behavior) is obtained.

Even if the existing field is used/reconstructed to carry the slice ID, the following problems may still exist when the flow information reported based on the IPFIX directly carries the slice ID.

1) There may be some legacy devices in a network, and even if a legacy device sets a corresponding field, this field may not represent a slice identifier from the perspective of this legacy device. Therefore, a packet analyzer needs to acquire the capability of each device in order to accurately acquire a slice identifier corresponding to a packet. 2) Different manners for carrying a slice identifier in a packet may be adopted in different forwarding plane technologies. Once a carrying position of the slice identifier changes or a new forwarding technology is introduced, the logic of a network analyzer needs to be updated accordingly.

Aiming at the described problems existing in the related art, the present disclosure provides a solution, and the present disclosure will be described below.

The method embodiments provided in the embodiments of the present disclosure may be implemented in a mobile terminal, a computer terminal, or a similar computing apparatus. Taking the implementation on a mobile terminal as an example, FIG. 1 is a block diagram showing the hardware structure of a mobile terminal for determining slice information according to the embodiments of the present disclosure. As shown in FIG. 1, the mobile terminal may include one or more (only one is shown in FIG. 1) processors 102 (the one or more processors 102 may include, but are not limited to, a Micro Controller Unit (MCU) or a processing apparatus such as a Field Programmable Gate Array (FPGA)) and a memory 104 configured to store data. In an exemplary embodiment, the mobile terminal may further include a transmission device 106 configured to perform communication functions and an input/output device 108. A person having ordinary skill in the art may understand that the structure shown in FIG. 1 is merely exemplary, and does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and a module of application software, such as a computer program corresponding to the method for determining slice information in the embodiments of the present disclosure. The one or more processors 102 run the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the one or more processors 102, and the memory may be connected to the mobile terminal over a network. Examples of such network includes, but is not limited to, the Internet, an intranet, a local area network, a mobile communication network, and combinations thereof.

The transmission device 106 is provided to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module configured to communicate wirelessly with the Internet.

The embodiments provide a method for determining slice information. FIG. 2 is a flowchart I of a method for determining slice information according to the embodiments of the present disclosure. As shown in FIG. 2, the flow includes the following operations S202 to S208.

At S202, an initial packet is received.

At S204, a target template matching the initial packet is determined from pre-configured templates, where the target template contains a target format of target slice information of a target slice associated with the initial packet.

At S206, a target packet is generated based on the initial packet and the target template, where the target packet contains the target slice information in the target format.

At S208, the target packet is sent to a receiving end to instruct the receiving end to execute an operation of parsing the target packet based on the target template, so as to determine the target slice information.

By means of the described operations, a target template matching a received initial packet is determined from pre-configured templates, where the target template contains a target format of target slice information of a target slice associated with the initial packet; then, a target packet is generated based on the initial packet and the target template; and then, the target packet is sent to a receiving end to instruct the receiving end to parse the target packet based on the target template and determine the target slice information. By means of the technical solution, the problem in the related art that slice information cannot be carried effectively in reported flow information is solved, thereby achieving the purpose of carrying slice information in reported flow information, and further achieving the effects of performing statistics and monitoring on traffic in a slice dimension.

The foregoing operations may be executed by a network device, for example, a network forwarding device, a network sending device, or a routing switching device. The foregoing operations may also be executed by, but are not limited to be executed by, other processing device or processing unit that has a similar processing capability. The following description takes the network forwarding device executing the foregoing operations as an example (which is only an exemplary description, and in actual operations, other devices or modules may also be used to execute the foregoing operations).

In the described embodiments, a network forwarding device receives an initial packet, and then determines a target template matching the initial packet from pre-configured templates. In practical applications, there may be a plurality of templates in the pre-configured templates, where the target template is a template matching the initial packet, and the target template contains a target format of target slice information of a target slice associated with the initial packet. The network forwarding device then generates a target packet based on the initial packet and the target template, where the target packet contains target slice information in the target format, i.e., a target packet is packet statistical information generated according to the target template and the initial packet satisfying a template condition, and the packet statistical information contains target slice information. The network forwarding device sends the target packet to a receiving end (for example, a network collector) to instruct the receiving end to parse the target packet based on the target template and determine the target slice information. By implementing the technical solution, the problem in the related art that slice information cannot be effectively carried in reported flow information can be effectively solved, thereby achieving the purpose of carrying slice information in reported flow information, and further achieving the effects of performing statistics and monitoring on traffic in a slice dimension.

In an exemplary embodiment, the target template matching the initial packet may be determined from the pre-configured templates in a following manner. The target slice information is compared with first slice information contained in a first template to obtain a comparison result, where the first template is any template in the pre-configured templates, and the comparison result indicates whether the target slice information contains the first slice information. In a case where the comparison result indicates that the target slice information contains the first slice information, it is determined that the first template is the target template. In this embodiment, there may be a plurality of templates in the pre-configured templates, and the target slice information is compared with first slice information contained in each template to obtain a comparison result, where the comparison result indicates whether the target slice information contains the first slice information. For example, a slice identifier type (corresponding to target slice information) of traffic received by a network forwarding device is ID-1, and a slice identifier type (corresponding to first slice information) in a certain template (such as a first template) is also ID-1, then the first template is a target template matching the initial packet. In practical applications, in a case where slice information in a template is a subset of the target slice information, it may be determined that the matching condition is also satisfied. For example, a certain template (such as a second template) only requires to collect slice information A and B, then traffic having slice information containing A, B and C is also considered to be matched with this template (namely, the second template). Therefore, in a case where the comparison result indicates that the target slice information includes the first slice information, it may be determined that the first template is a target template. By means of the present embodiment, the purpose of determining a target template matching target slice information is achieved.

In an exemplary embodiment, before generating the target packet based on the initial packet and the target template, the method further includes the following operation: the target template is compared with a local table entry to obtain a second comparison result, where the second comparison result indicates whether the target template matches the local table entry, and the local table entry is used for recording a correspondence between a packet and slice information. The operation of generating the target packet based on the initial packet and the target template may include the following operation: in a case where the second comparison result indicates that the target template matches the local table entry, the target packet is generated based on the initial packet and the target template. In this embodiment, before generating the target packet based on the initial packet and the target template, a network forwarding device compares the target template with a local table entry to determine whether the target template matches the local table entry, where the local table entry is used for recording a correspondence between a packet and slice information; and generates the target packet based on the initial packet and the target template only when the second comparison result indicates that the target template matches the local table entry. In practical applications, the network forwarding device determines a corresponding local table entry based on the received traffic, and then compares slice information contained in the local table entry with the slice information contained in the target template to determine whether they are consistent, the network forwarding device will not report the packet information in a case where they are inconsistent, and the network forwarding device will send the packet information carrying the slice information only in a case where they are consistent.

In an exemplary embodiment, before sending the target packet to the receiving end, the method may further include the following operation: the target template is sent to the receiving end. The operation of sending the target packet to the receiving end includes the following operation: the target packet carrying an identifier of the target template is sent to the receiving end. In this embodiment, before sending the target packet to the receiving end (or a network collector), a network forwarding device (or a network exporter) sends the target template to the receiving end. In practical applications, the network exporter reports all templates (possibly including a plurality of templates) configured to the network exporter to the network collector in advance. When sending the target packet to the receiving end, the network exporter may send the target packet carrying an identifier of the target template to the receiving end. In practical applications, when sending the packet information, the network exporter carries a template identifier (for example, a template ID) of the matched template in a packet header, where the template identifier indicates a specific template corresponding to the packet information, so that after receiving the packet information, the network collector can know which template is to be used when parsing the slice information from the packet information.

In an exemplary embodiment, the target slice information may include at least one of: a slice identifier type of the target slice; a slice identifier of the target slice; a carrying position of a slice identifier of the target slice in the target packet; content of a slice forwarding entry corresponding to the target slice. In this embodiment, the target slice information may include a plurality of different types of information, thereby achieving an objective of carrying slice information of different types, and improving flexibility of the manner in which slice information is carried.

The embodiment further provides a method for determining slice information. FIG. 3 is a flowchart II of a method for determining slice information according to the embodiments of the present disclosure. As shown in FIG. 3, the flow includes the following operations S302 to S306.

At S302, a target packet is acquired from a sending end, where the target packet is generated based on an initial packet and a target template matching the initial packet, the target template contains a target format of target slice information of a target slice associated with the initial packet, and the target packet contains the target slice information in the target format.

At S304, the target template is determined based on the target packet.

At S306, the target packet is parsed based on the target template to determine the target slice information.

By means of the operations, a target packet sent by a sending end is acquired, where the target packet is generated based on an initial packet and a target template matching the initial packet, the target template contains a target format of target slice information of a target slice associated with the initial packet, and the target packet contains target slice information in the target format, thereby achieving the purpose of carrying slice information in the packet. The target template is determined based on the target packet, and then the target slice information can be determined by parsing the target packet based on the target template. By means of the technical solution, the problem in the related art that slice information cannot be effectively carried in reported flow information is solved, the purpose of carrying slice information in the reported flow information is achieved, and target slice information can be determined based on a target packet, thereby achieving the effects of performing statistics and monitoring on traffic in a slice dimension.

The foregoing operations may be executed by a network device, such as a network receiving device or a network collector. The foregoing operations may also be executed by, but are not limited to be executed by, other processing device or processing unit that has a similar processing capability. The following description takes a network collector performing the foregoing operations as an example (which is only an exemplary description, and in actual operations, other devices or modules may also perform the foregoing operations).

In the foregoing embodiment, a network collector acquires a target packet from a sending end (for example, a network exporter), where the target packet is generated by the network exporter based on an initial packet and a target template matching the initial packet, the target template includes a target format of target slice information of a target slice associated with the initial packet, and the target packet includes target slice information in the target format. By virtue of the solution, a purpose of carrying slice information in the packet is achieved. In addition, the network collector can determine the target template based on the target packet, and then parse the target packet based on the target template, so as to determine the target slice information. The purpose of carrying slice information in reported flow information is achieved, and target slice information can be determined based on a target packet, thereby achieving the effects of performing statistics and monitoring on traffic in a slice dimension.

In an exemplary embodiment, before acquiring the target packet from the sending end, the method may further include an operation of acquiring the target template from the sending end. The target template may be determined based on the target packet in a following manner. An identifier of the target template carried in the target packet is determined, and the target template is determined based on the identifier of the target template. In this embodiment, before acquiring the target packet from the sending end (for example, a network exporter), a network collector first acquires a target template sent by the network exporter. In practical applications, the network exporter may report, to the network collector, the templates (possibly including a plurality of templates) configured to the network exporter in advance. The target template may be determined based on the target packet in the following manner. The identifier information of the target template carried in the target packet may be firstly determined, for example, in practical applications, when sending packet information, a network exporter carries a template identifier (e.g., a template ID) of the matched template in a packet header. After determining the identifier information of the target template, the network collector may determine the target template based on the identifier information of the target template.

In an exemplary embodiment, the target packet may be parsed based on the target template to determine the slice information in the following manner. The target format of the target slice information contained in the target template may be determined; and the target packet may be parsed based on the target format to determine the target slice information contained in the target packet. In this embodiment, the network collector may parse the target packet based on the target template and determines the target slice information in the following manner. The target format of the target slice information contained in the target template may be determined, and then the target packet may be parsed based on the target format, so as to further determine the target slice information contained in the target packet. Through this embodiment, the objective of determining the target slice information based on a target packet is achieved.

In an exemplary embodiment, the target slice information may include at least one of: a slice identifier type of the target slice; a slice identifier of the target slice; a carrying position of a slice identifier of the target slice in the target packet; content of a slice forwarding entry corresponding to the target slice. In this embodiment, the target slice information includes a plurality of different types of information, thereby achieving an objective of carrying slice information of different types, and improving flexibility of the manner in which the slice information is carried.

In an exemplary embodiment, the operation that the target packet is parsed based on the target format to determine the target slice information contained in the target packet may be implemented in at least one of the following manners. In a case where the target format indicates that the target slice information includes the slice identifier of the target slice, the target packet is parsed based on the target format to obtain the slice identifier contained in the target slice information. In a case where the target format indicates that the target slice information includes a carrying manner of the slice identifier of the target slice in the target packet, the target packet is parsed based on the target format to obtain the target slice information, and the slice identifier carried in the target packet in the carrying manner is acquired. In a case where the target format indicates that the target slice information includes a carrying manner of the slice identifier of the target slice in the target packet and a slice identifier field of the target slice, the target packet is parsed based on the target format to obtain the slice identifier carried in the target packet in the carrying manner and the slice identifier indicated by the slice identifier field. In a case where the target format indicates that the target slice information is multi-layer slice information, the target packet is parsed based on the target format to obtain slice information of each layer. In this embodiment, a network collector may parse the target packet based on the target format to determine the target slice information in at least one of the following four manners. In Manner 1, in a case where the target format indicates that the target slice information contains a slice identifier of the target slice, the target packet is parsed based on the target format to obtain the slice identifier contained in the target slice information. For example, in a practical application, in a case where reported slice information only contains a slice identifier, the network collector parses a target packet based on the target format to obtain the slice identifier contained in the target slice information. As an exemplary implementation, in a practical application, the network collector generally stores the slice identifier after parsing the target packet. In Manner 2, in a case where the target format indicates that the target slice information includes a carrying manner of the slice identifier of the target slice in the target packet, the target packet is parsed based on the target format to obtain the target slice information, and the slice identifier carried in the target packet in the carrying manner is acquired. For example, in a case where the slice information carries a carrying manner of the slice identifier of the target slice in the target packet, and when the carrying manner of the slice identifier in the target packet has a corresponding value, it represents that the slice identifier is carried in a specific position in the packet, and a network collector parses the target packet based on the target format to obtain the target slice information, and acquires the slice identifier carried in the target packet, i.e., acquires the value of the target slice identifier carried in the target packet. In Manner 3, in a case where the target format indicates that the target slice information includes a carrying manner of the slice identifier of the target slice in the target packet and a slice identifier field of the target slice, the target packet is parsed based on the target format, so as to obtain the slice identifier carried in the target packet in the carrying manner and the slice identifier indicated by the slice identifier field. For example, in a case where the target slice information also carries a slice identifier field in addition to the carrying manner of the slice identifier in the target packet, the network collector parses the target packet, compares the slice identifier acquired from the target packet with the slice identifier indicated by the slice identifier field, and in practical applications, such comparison can be performed to determine whether the slice identifier indicated by the slice identifier field is accurate, and in a case where the values of the two are inconsistent or there is no correlation, such a record may be marked as abnormal. In Manner 4, in a case where the target format indicates that the target slice information is multi-layer slice information, the target packet is parsed based on the target format to obtain slice information of each layer. For example, in a hierarchical slice network, in a case where the target format indicates that the target slice information is multi-layer slice information, a network collector parses the target packet based on the target format to obtain slice information of each layer, that is, the network collector independently parses slice information of each layer. Through this embodiment, the target packet may be parsed based on different target formats in different manners to determine the target slice information.

In an exemplary embodiment, after acquiring the slice identifier carried in the target packet in the carrying manner and the slice identifier indicated by the slice identifier field, the method may further include: whether the slice identifier carried in the target packet is consistent with a slice identifier indicated by the slice identifier field may be compared; and in a case where the slice identifier carried in the target packet is inconsistent with the slice identifier indicated by the slice identifier field, it is determined that a local table entry of the sending end is abnormal, where the slice identifier field is determined by the sending end based on the local table entry. In this embodiment, after acquiring the slice identifier carried in the target packet in the carrying manner and the slice identifier indicated by the slice identifier field, the network collector may compare the slice identifier obtained from the target packet with the slice identifier indicated by the slice identifier field to determine whether they are consistent; and in a case where a comparison result indicates that they are inconsistent, that is, in a case where the slice identifier obtained from the target packet is inconsistent with the slice identifier indicated by the slice identifier field, it is determined that a local table entry of the sending end is abnormal, where the slice identifier is determined by the sending end based on the local table entry. In practical applications, such a record may be marked as abnormal.

The present disclosure will be described below in detail in conjunction with exemplary embodiments.

Exemplary Embodiment 1

FIG. 4 is a flowchart of a method for collecting slice information according to the embodiments of the present disclosure. As shown in FIG. 4, the flow includes the following operations S402 to S408.

At S402, an IPFIX template of an exporter (corresponding to the described network forwarding device or network sending device) is configured to request the exporter to report slice information. The IPFIX template is configured and enabled on the exporter, i.e., the forwarding device, and the exporter is required to also contain the slice information when collecting and reporting traffic. The slice information may include a slice identifier type, a slice identifier, a carrying position of the slice identifier in a packet, and specific contents (such as information about the next hop and the queue) of a slice forwarding entry.

At S404, the exporter reports packet information carrying the slice information to the collector (corresponding to the described network collector). After receiving traffic, the exporter firstly needs to match the traffic with a pre-configured template, including for example matching the slice information related to the traffic with slice information carried in the template. For example, in a case where the slice identifier type in a certain template is flex-algo ID, the slice identifier type of the traffic matching this template also needs to be flex-algo ID. In a case where the slice information in the template is a subset of the slice information related to the traffic, it is also considered that a matching condition is satisfied. For example, in a case where the template requires to collect only slice information A and B, the traffic having slice information containing A, B and C is also considered to be matched with the template. In a case where the traffic matches a template, slice information is carried in reported packet information according to a correspondence between the traffic and the slice. According to a reporting rule of IPFIX, when reporting information to the collector, the exporter needs to report data template information first, and then report specific data value information.

It should be noted that, in a practical application, in a case where a specific traffic matches a plurality of templates, a plurality of pieces of information corresponding to respective templates are reported.

At S406, the collector parses the data from the exporter, acquires and stores the correspondence between the packet and the slice, enters a corresponding slice information parsing manner according to the data template, and parses the data packet received from the exporter.

At S408, the analyzer extracts data from the collector and performs subsequent processing. A network analyzer extracts statistical data from the collector and performs subsequent processing, thereby providing a basis for a service. The processing operations related to slicing may include slice-based accounting, visualization of slice topology and real-time usage, etc.

By means of the described embodiments, the purpose of carrying slice information in reported flow information is achieved, and target slice information can also be determined based on a target packet, thereby achieving the effects of performing statistics and monitoring on traffic in a slice dimension.

In some exemplary implementations, according to different content contained in slice information reported by the exporter, the collector may use different slice information parsing manners, which are described below with reference to some examples.

Manner 1: a simple mode in which reported slice information only includes a slice identifier. When a collector parses and stores a packet, the collector directly stores the value in the field as the slice identifier of the packet.

Manner 2: a packet extraction mode in which slice information carries a carrying manner of a slice identifier in a packet. When a carrying manner of the slice identifier in the packet is set as a corresponding value, it indicates that a slice identifier is explicitly carried in a specific position in the packet, for example, a slice identifier may be carried in the first 8 bits of the IPv6 Flow Label, and the collector acquires, according to the IPv6 Flow Label value in the reported packet, the slice identifier value carried in the packet. In a case where a corresponding value cannot be obtained according to the carrying manner of the slice identifier in the packet, for example, the carrying manner indicates that the slice identifier is carried in the IPv6 Flow Label, but the reported actual data does not carry the IPv6 Flow Label field, the record should be marked as abnormal.

Manner 3: a comparison mode which is based on the foregoing Manner 2 and in which a slice identifier field is further carried in addition to the carrying manner of the slice identifier in the packet. The exporter may indicate, in a manner such as a slice identifier type, that the value of the slice identifier field is acquired by the exporter according to a local table entry recording the correspondence between the packet and the slice. On this basis, the collector may compare the slice identifier obtained from the packet with a directly reported slice identifier, so as to determine whether the slice information stored in the local forwarding entry of the exporter is accurate.

Manner 4: a hierarchical mode. In a hierarchical slicing network, data reported by an exporter may include slice information of multiple layers, expression modes of the slice information of different layers are independent of each other and may adopt any combination of the described Manners 1, 2 and 3, and the collector independently parses the slice of each layer.

Exemplary Embodiment 2

FIG. 5 is a schematic diagram I of a data template carrying slice information and reported by an exporter according to the embodiments of the present disclosure. As shown in FIG. 5, taking an SRv6 network as an example, in order to support the reporting of slice information, the template shown in FIG. 5 includes two newly defined elements of IPFIX, which are respectively as follows.

NetworksliceID type: this element is used for indicating a type of a slice ID. A type value corresponding to the element is TBA1, that is, in a case where TBA1 is found in the template, it represents the field in the corresponding data is used for carrying the type of the slice ID. Correspondingly, a corresponding type value of the slice ID needs to be further defined, for example:

0: slice is not supported or slice is not configured;
1: FA ID is used as the slice identifier;
2: MT-ID is used as the slice identifier;
3: All is used as the slice identifier;
. . .
255: unknown type.

NetworksliceID value: a type value corresponding to this element is TBA2, that is, in a case where TBA2 is found in the template, it represents the field in the corresponding data carries the value of the slice ID.

FIG. 6 is a schematic diagram I of actual data content reported by an exporter according to the embodiments of the present disclosure. As shown in FIG. 6, the data represents a corresponding template ID of 256. A result of parsing the data according to the template is that a source IPv6 address of the packet is ff06::c2, a destination IPv6 address of the packet is ff06::c3, the type of the slice ID is FA-ID, and the value of the slice ID is 129. Further, in the SRv6 network, the IPv6 address represents the current SRv6 SID, so that the collector may obtain the correspondence between the SID and the slice ID. Similarly, in the MPLS network, in a case where the MPLS label and the slice ID information are included at the same time when reporting the packet information, the correspondence between the MPLS label and the slice ID may also be obtained.

The slice ID type is not mandatory, and may be selectively configured according to a data collection requirement. This embodiment corresponds to the manner of carrying slice information in a simple mode.

Exemplary Embodiment 3

FIG. 7 is a schematic diagram II of a data template carrying slice information and reported by an exporter according to the embodiments of the present disclosure. As shown in FIG. 7, in order to support the reporting of slice information, the template includes two newly defined elements of IPFIX, which are as follows respectively.

Network sliceID type: the slice ID type and value are the same as those defined in the Exemplary embodiment 2.

Network sliceID position: this element indicates a carrying manner of the slice ID. The type value corresponding to the element is TBA3, that is, in a case where TBA3 is found in the template, it represents the field in the corresponding data carries a carrying manner of the slice ID. Correspondingly, the value corresponding to the carrying manner of the slice ID needs to be defined, for example:

0: the slice ID is not explicitly carried;
1: the slice ID is carried in an MPLS entropy label;
2: the slice ID is carried in the last 8 bits of an IPv6 Flow Label.

FIG. 8 is a schematic diagram II of actual data content reported by an exporter according to the embodiments of the present disclosure. As shown in FIG. 8, in the actual data content reported by the exporter, it indicates that the template ID corresponding to the data is 257. The result of parsing the data according to the template is that the destination IPv6 address of the packet is ff06::c3, the Flow Label is 519 (namely, binary 1000000111), the slice ID type is AII, the carrying manner of the slice ID is that the slice ID is carried in the last 8 bits of the IPv6 Flow Label, and therefore the slice ID is 127 according to the IPv6 Flow Label.

It should be noted that, in a case where the packet is extended to newly define a field dedicated for carrying the slice information, in addition to a corresponding type value of a carrying position (i.e., carrying manner) of the slice identifier, a newly defined IPFIX element or element type value also needs to be defined for the newly defined field.

For example, when an MPLS label type dedicated for carrying a slice is newly defined, a new value for representing a new MPLS label type needs to be defined in values of the existing IPFIX MPLS label type element (the current MPLS label types include a VPN label, a BGP related label, an LDP label, and the like). In a case where a field type not included in the current IPFIX element is extended to carry the slice information, a new element of IPFIX needs to be defined. For example, in a case where a new data extension header or an IPv6 extension header TLV carried at the bottom of the MPLS label stack is newly defined to carry the slice information, a new element of IPFIX is newly defined for the newly added data extension header or TLV.

In a case where the reported template and data further carry the network slice ID value information defined in Exemplary embodiment 2, a comparison mode is entered correspondingly to compare whether the network slice ID value is consistent with the slice ID obtained from the Flow Label or whether the mapping relationship between the network slice ID value and the slice ID obtained from the Flow Label is correct.

This embodiment corresponds to a manner of carrying the slice information in a packet extraction mode.

Exemplary Embodiment 4

In the above Exemplary embodiment 3, a networksliceID position element dedicated for indicating the carrying position of the slice ID in the packet is defined. In practical use, there are many extension methods for indicating the manner of carrying the slice ID in the packet. This embodiment provides another example, which enables to support the simple mode of the above Exemplary embodiment 2 and the packet extraction mode of the above Exemplary embodiment 3 based on fewer new elements.

Similar to the above Exemplary embodiment 2, two new elements are defined as follows.

NetworksliceID type: this element is used for indicating a type of the slice ID. The type value corresponding to the element is TBA1, that is, in a case where TBA1 is found in the template, it represents the field in the corresponding data carries the type of the slice ID. Correspondingly, a corresponding value of the slice ID type also needs to be defined, and a manner of carrying the slice ID and the slice ID type may be acquired based on the corresponding value. For example:

0: slice is not supported or slice is not configured;
    1: FA ID is used as the slice identifier;
    2: MT-ID is used as the slice identifier;
    3: AII is used as the slice identifier;
    4: FA ID is used as the slice identifier and is carried in the IPv6 Flow Label;

5: MT-ID is used as the slice identifier and is carried in the IPv6 Flow Label;
    6: MT-ID is used as the slice identifier and is carried in the MPLS label;
    . . .
    255: unknown type.

NetworksliceID value: the type value corresponding to this element is TBA2, that is, in a case where TBA2 is found in the template, it represents the field in the corresponding data carries the value of the slice ID.

When a collector extracts data, in a case where it is found according to the slice ID type value that the slice ID is explicitly carried in a packet, and a networksliceID value is set with a value, it represents that a slice identifier is carried in a local table entry and a packet at the same time, a comparison mode is correspondingly entered to compare the slice identifier acquired from the packet and the slice identifier in the local table entry.

Exemplary Embodiment 5

FIG. 9 is a schematic diagram of a data template carrying hierarchical slice information and reported by an exporter according to the embodiments of the present disclosure. As shown in FIG. 9, in a hierarchical slice network, an IPFIX is required to be able to report slice information of each layer. FIG. 9 shows a data template carrying information of two layers of slices reported by an exporter.

In order to report hierarchical slice information, in addition to the networksliceID type, networksliceID value, and networksliceID position defined in the above Exemplary embodiment 2 and Exemplary embodiment 3, information related to the second layer slice needs to be further defined, for example, networksliceID2 type, networksliceID2 value, and networksliceID2 position. The data structure and data value of the information related to the second layer slice may be consistent with those of the top layer slice, and the information related to the second layer slice only differs from the information related to the top layer slice in terms of its type.

Figure 10:
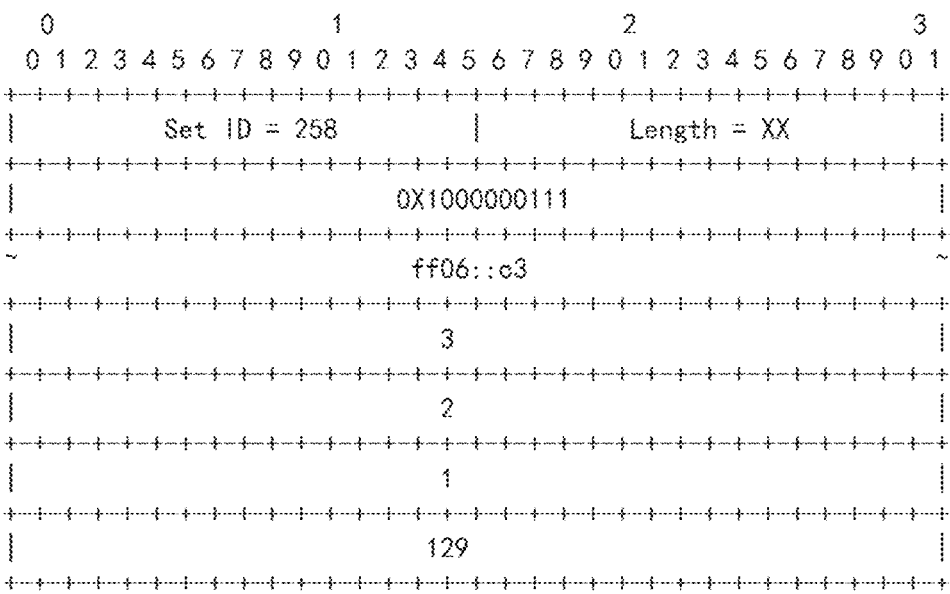
FIG. 10 is a schematic diagram of actual data content carrying hierarchical slice information and reported by an exporter according to the embodiments of the present disclosure.

FIG. 10 is a schematic diagram of actual data content carrying hierarchical slice information and reported by an exporter according to the embodiments of the present disclosure. As shown in FIG. 10, the actual data content reported by the exporter indicates that a template ID corresponding to the data is 258. A result of parsing the data according to the template is that a manner of carrying the top slice ID in a packet is that the top slice ID is carried in the last 8 bits of an IPv6 Flow Label, and therefore the top slice ID is 127 according to the Flow Label; a second layer slice ID of the packet is 129, and a slice ID type is FA-ID.

In a case where a slice structure having more than two layers exists, a similar method may be used to define relevant new elements such as networksliceID3 and networksliceID4.

It should be noted that, the data structure and the data content described in the embodiments of the present disclosure are not used to limit the actual transmission format. During actual data transmission, other formats such as XML may be used, but the data structure and the data content may be consistent.

In addition to the slice identifier type, the slice identifier, and the carrying position of the slice identifier in a packet that are mentioned in the embodiments, the slice information may also be other packet content related to a slice or content in a local table entry of a device, for example, a forwarding queue corresponding to the slice. Similarly, a new element or element type needs to be defined to carry and report a corresponding template and data.

In order to facilitate understanding of the embodiments of the present disclosure, the abbreviations and full English names of related terms are provided. Table 1 is a related technical term table, as shown in Table 1:

TABLE 1

| Acronym | Full Name |
| --- | --- |
| ID | Identifier |
| SR | Segment Routing |
| SID | Segment Identifier |
| IGP | Interior Gateway Protocol |
| BGP | Border Gateway Protocol |
| LDP | Label Distribution Protocol |
| IPFIX | IP Flow Information Export |
| FA | Flex-algorithm |
| XML | Extensible Markup Language |

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a better implementation. Based on such understanding, the essence of the technical solutions of the embodiments of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the method of the embodiments of the present disclosure.

Figure 11:
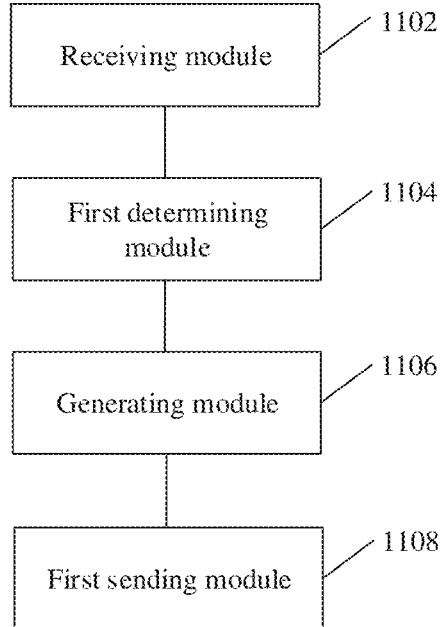
FIG. 11 is a structure diagram I of a device for determining slice information according to the embodiments of the present disclosure.

The embodiments further provide an apparatus for determining slice information. FIG. 11 is a structure diagram I of a device for determining slice information according to the embodiments of the present disclosure. As shown in FIG. 11, the apparatus includes:

a receiving module 1102, configured to receive an initial packet;

a first determining module 1104, configured to determine, from pre-configured templates, a target template matching the initial packet, where the target template contains a target format of target slice information of a target slice associated with the initial packet;

a generating module 1106, configured to generate a target packet based on the initial packet and the target template, where the target packet contains the target slice information in the target format; and a first sending module 1108, configured to send the target packet to a receiving end to instruct the receiving end to execute following operations: parsing the target packet based on the target template, so as to determine the target slice information.

In an exemplary embodiment, the first determining module 1104 includes: a comparing unit, configured to compare the target slice information with first slice information contained in a first template to obtain a comparison result, where the first template is any template in the pre-configured templates, and the comparison result indicates whether the target slice information contains the first slice information; and a first determining unit, configured to, in a case where the comparison result indicates that the target slice information contains the first slice information, determine that the first template is the target template.

In an exemplary embodiment, the apparatus further includes: a first comparing module, configured to compare the target template with a local table entry before generating the target packet based on the initial packet and the target template, so as to obtain a second comparison result, where the second comparison result indicates whether the target template matches the local table entry, and the local table entry is used for recording a correspondence between a packet and slice information; and the generating module 1106 includes: a generating unit, configured to, in a case where the second comparison result indicates that the target template matches the local table entry, generate the target packet based on the initial packet and the target template.

In an exemplary embodiment, the apparatus may further include: a second sending module, configured to send the target template to the receiving end before sending the target packet to the receiving end; and the first sending module 1108 includes: a sending unit, configured to send the target packet carrying an identifier of the target template to the receiving end.

In an exemplary embodiment, the target slice information may include at least one of: a slice identifier type of the target slice; a slice identifier of the target slice; a carrying position of a slice identifier of the target slice in the target packet; and content of a slice forwarding entry corresponding to the target slice.

Figure 12:
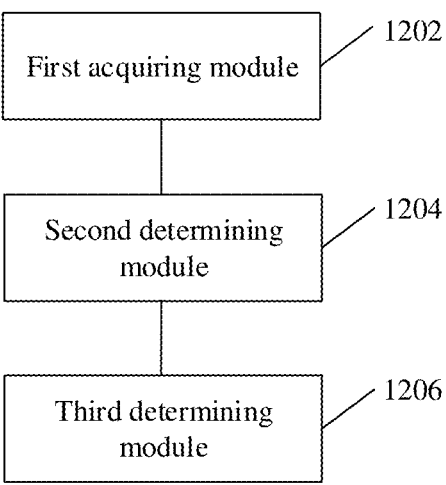
FIG. 12 is a structure diagram II of a device for determining slice information according to the embodiments of the present disclosure.

The embodiments further provide a device for determining slice information. FIG. 12 is a structure diagram II of a device for determining slice information according to the embodiments of the present disclosure. As shown in FIG. 12, the apparatus includes:

a first acquiring module 1202, configured to acquire a target packet from a sending end, where the target packet is generated based on an initial packet and a target template matching the initial packet, the target template contains a target format of target slice information of a target slice associated with the initial packet, and the target packet contains the target slice information in the target format;

a second determining module 1204, configured to determine the target template based on the target packet; and a third determining module 1206, configured to parse the target packet based on the target template to determine the target slice information.

In an exemplary embodiment, the apparatus may further include: a second acquiring module, configured to acquire the target template from the sending end before acquiring the target packet from the sending end; and the second determining module 1204 includes: a second determining unit, configured to determine an identifier of the target template carried in the target packet, and determine the target template based on the identifier of the target template.

In an exemplary embodiment, the third determining module 1206 may include: a third determining unit, configured to determine the target format of the target slice information contained in the target template; a fourth determining unit, configured to parse the target packet based on the target format to determine the target slice information contained in the target packet.

In an exemplary embodiment, the target slice information may include at least one of: a slice identifier type of the target slice; a slice identifier of the target slice; a carrying position of a slice identifier of the target slice in the target packet; and content of a slice forwarding entry corresponding to the target slice.

In an exemplary embodiment, the fourth determining unit includes at least one of: a first acquiring subunit, configured to, in a case where the target format indicates that the target slice information includes the slice identifier of the target slice, the target packet based on the target format to obtain the slice identifier contained in the target slice information; a second acquiring subunit, configured to, in a case where the target format indicates that the target slice information includes a carrying manner of the slice identifier of the target slice in the target packet, parse the target packet based on the target format to obtain the target slice information, and acquire the slice identifier carried in the target packet in the carrying manner; a third acquiring subunit, configured to, in a case where the target format indicates that the target slice information includes a carrying manner of the slice identifier of the target slice in the target packet and a slice identifier field of the target slice, parse the target packet based on the target format to obtain the slice identifier carried in the target packet in the carrying manner and the slice identifier indicated by the slice identifier field; and a fourth acquiring subunit, configured to, in a case where the target format indicates that the target slice information is multi-layer slice information, parse the target packet based on the target format to obtain slice information of each layer.

In an exemplary embodiment, the apparatus may further include: a second comparing module, configured to, after parsing the target packet based on the target format to obtain the slice identifier carried in the target packet in the carrying manner and the slice identifier indicated by the slice identifier field, compare whether the slice identifier carried in the target packet is consistent with a slice identifier indicated by the slice identifier field; and a fourth determining module, configured to determine that a local table entry of the sending end is abnormal in a case where the slice identifier carried in the target packet is inconsistent with the slice identifier indicated by the slice identifier field, where the slice identifier field is determined by the sending end based on the local table entry.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, where the computer program, when running on a processor, causes the processor to execute the operations in any one of the described method embodiments.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic device, including a memory and a processor. The memory stores a computer program. The processor is configured to run the computer program to execute operations in any one of the method embodiments.

In an exemplary embodiment, the electronic device may further include a transmission device and an input/output device, where the transmission device is connected to the processor, and the input/output device is connected to the processor.

For specific examples in this embodiment, reference may be made to the examples described in the foregoing embodiments and exemplary embodiments, and details are not repeatedly described in this embodiment.

By means of the embodiments provided in the present disclosure, the mechanism of IPFIX can be expanded, so that the IPFIX can support carrying relevant slice information in a collection packet, thereby enabling operations, such as statistical calculation and monitoring, to be performed on traffic in a slice dimension. The solution can support a single-layer and hierarchical network slice structure, and can support information collection under a plurality of slice information carrying manners, including for example the slice information being carried in a packet, being carried in a local table entry, and being carried in the packet and the local table entry at the same time. Furthermore, the comparison between a slice identifier in a packet and a slice identifier in a local table entry can also be supported.

Obviously, those having ordinary skill in the art should understand that each module or each operation of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices. The shown or described operations may be executed in sequences different from those described here in some cases. The shown or described modules or operations may form respective integrated circuit modules, or multiple modules or operations therein may form a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection defined by the appended set of claims of the present disclosure.

What is claimed is:

1. A method for determining slice information, comprising:

receiving an initial packet;

determining, from pre-configured templates, a target template matching the initial packet, wherein the target template contains a target format of target slice information of a target slice associated with the initial packet;

generating a target packet based on the initial packet and the target template, wherein the target packet contains the target slice information in the target format; and sending the target packet to a receiving end to instruct the receiving end to execute following operations: parsing the target packet based on the target template, so as to determine the target slice information;

wherein determining, from the pre-configured templates, the target template matching the initial packet comprises:

comparing the target slice information with first slice information contained in a first template to obtain a comparison result, wherein the first template is any template in the pre-configured templates, and the comparison result indicates whether the target slice information contains the first slice information; and in a case where the comparison result indicates that the target slice information contains the first slice information, determining that the first template is the target template.

2. The method according to claim 1, wherein before generating the target packet based on the initial packet and the target template, the method further comprises: comparing the target template with a local table entry to obtain a second comparison result, wherein the second comparison result indicates whether the target template matches the local table entry, and the local table entry is used for recording a correspondence between a packet and slice information; and generating the target packet based on the initial packet and the target template comprises: in a case where the second comparison result indicates that the target template matches the local table entry, generating the target packet based on the initial packet and the target template.

3. The method according to claim 1, wherein before sending the target packet to the receiving end, the method further comprises: sending the target template to the receiving end; and sending the target packet to the receiving end comprises: sending the target packet carrying an identifier of the target template to the receiving end.

4. The method according to claim 1, wherein the target slice information comprises at least one of:

a slice identifier type of the target slice;

a slice identifier of the target slice;

a carrying position of a slice identifier of the target slice in the target packet; and content of a slice forwarding entry corresponding to the target slice.

5. The method according to claim 1, wherein before sending the target packet to the receiving end, the method further comprises: sending the pre-configured templates to the receiving end; and sending the target packet to the receiving end comprises: sending the target packet carrying an identifier of the target template to the receiving end.

6. The method according to claim 1, wherein the target slice information comprises at least one of: a next hop of a slice forwarding entry, and a queue of the slice forwarding entry.

7. A method for determining slice information, comprising:

acquiring a target packet from a sending end, wherein the target packet is generated based on an initial packet and a target template matching the initial packet, the target template contains a target format of target slice information of a target slice associated with the initial packet, and the target packet contains the target slice information in the target format; the target template is determined by the sending end by comparing the target slice information with first slice information contained in a first template, so as to obtain a comparison result, in a case where the comparison result indicates that the target slice information contains the first slice information, determining that the first template is the target template, wherein the first template is any template in the pre-configured templates, and the comparison result indicates whether the target slice information contains the first slice information;

determining the target template based on the target packet; and parsing the target packet based on the target template to determine the target slice information.

8. The method according to claim 7, wherein before acquiring the target packet from the sending end, the method further comprises: acquiring the target template from the sending end; and determining the target template based on the target packet comprises: determining an identifier of the target template carried in the target packet, and determining the target template based on the identifier of the target template.

9. The method according to claim 7, wherein parsing the target packet based on the target template to determine the target slice information comprises:

determining the target format of the target slice information contained in the target template; and parsing the target packet based on the target format to determine the target slice information contained in the target packet.

10. The method according to claim 7, wherein the target slice information comprises at least one of:

a slice identifier type of the target slice;

a slice identifier of the target slice;

a carrying position of a slice identifier of the target slice in the target packet; and content of a slice forwarding entry corresponding to the target slice.

11. The method according to claim 10, wherein parsing the target packet based on the target format to determine the target slice information contained in the target packet comprises at least one of:

in a case where the target format indicates that the target slice information comprises the slice identifier of the target slice, parsing the target packet based on the target format to obtain the slice identifier contained in the target slice information;

in a case where the target format indicates that the target slice information comprises a carrying manner of the slice identifier of the target slice in the target packet, parsing the target packet based on the target format to obtain the target slice information, and acquiring the slice identifier carried in the target packet in the carrying manner;

in a case where the target format indicates that the target slice information comprises a carrying manner of the slice identifier of the target slice in the target packet and a slice identifier field of the target slice, parsing the target packet based on the target format to obtain the slice identifier carried in the target packet in the carrying manner and the slice identifier indicated by the slice identifier field; and in a case where the target format indicates that the target slice information is multi-layer slice information, parsing the target packet based on the target format to obtain slice information of each layer.

12. The method according to claim 11, wherein after parsing the target packet based on the target format to obtain the slice identifier carried in the target packet in the carrying manner and the slice identifier indicated by the slice identifier field, the method further comprises:

comparing whether the slice identifier carried in the target packet is consistent with a slice identifier indicated by the slice identifier field; and in a case where the slice identifier carried in the target packet is inconsistent with the slice identifier indicated by the slice identifier field, determining that a local table entry of the sending end is abnormal, wherein the slice identifier field is determined by the sending end based on the local table entry.

13. The method according to claim 7, wherein before acquiring the target packet from the sending end, the method further comprises: acquiring pre-configured templates of the sending end from the sending end, wherein the target template is a template matching the initial packet and determined from the pre-configured templates; and determining the target template based on the target packet comprises: determining an identifier of the target template carried in the target packet, and determining the target template based on the identifier of the target template.

14. The method according to claim 7, wherein the target slice information comprises at least one of: a next hop of a slice forwarding entry, and a queue of the slice forwarding entry.

15. The method according to claim 7, further comprising:

sending the target slice information to an analyzer for subsequent processing, wherein the subsequent processing comprises at least one of: slice-based accounting, visualization of slice topology and real-time usage.

16. A non-transitory computer-readable storage medium, the computer-readable storage medium storing program, wherein the program, when running on a processor, causes the processor to execute the method according to claim 1.

17. An electronic device, comprising a memory and a processor, wherein the memory stores a computer program, and the processor is configured to execute the method according to claim 1 when running the computer program.

18. A non-transitory computer-readable storage medium, the computer-readable storage medium storing program, wherein the program, when running on a processor, causes the processor to execute the method according to claim 6.

19. An electronic device, comprising a memory and a processor, wherein the memory stores a computer program, and the processor is configured to execute the method according to claim 7 when running the computer program.

* * * * *